UNITED STATES PATENT OFFICE.

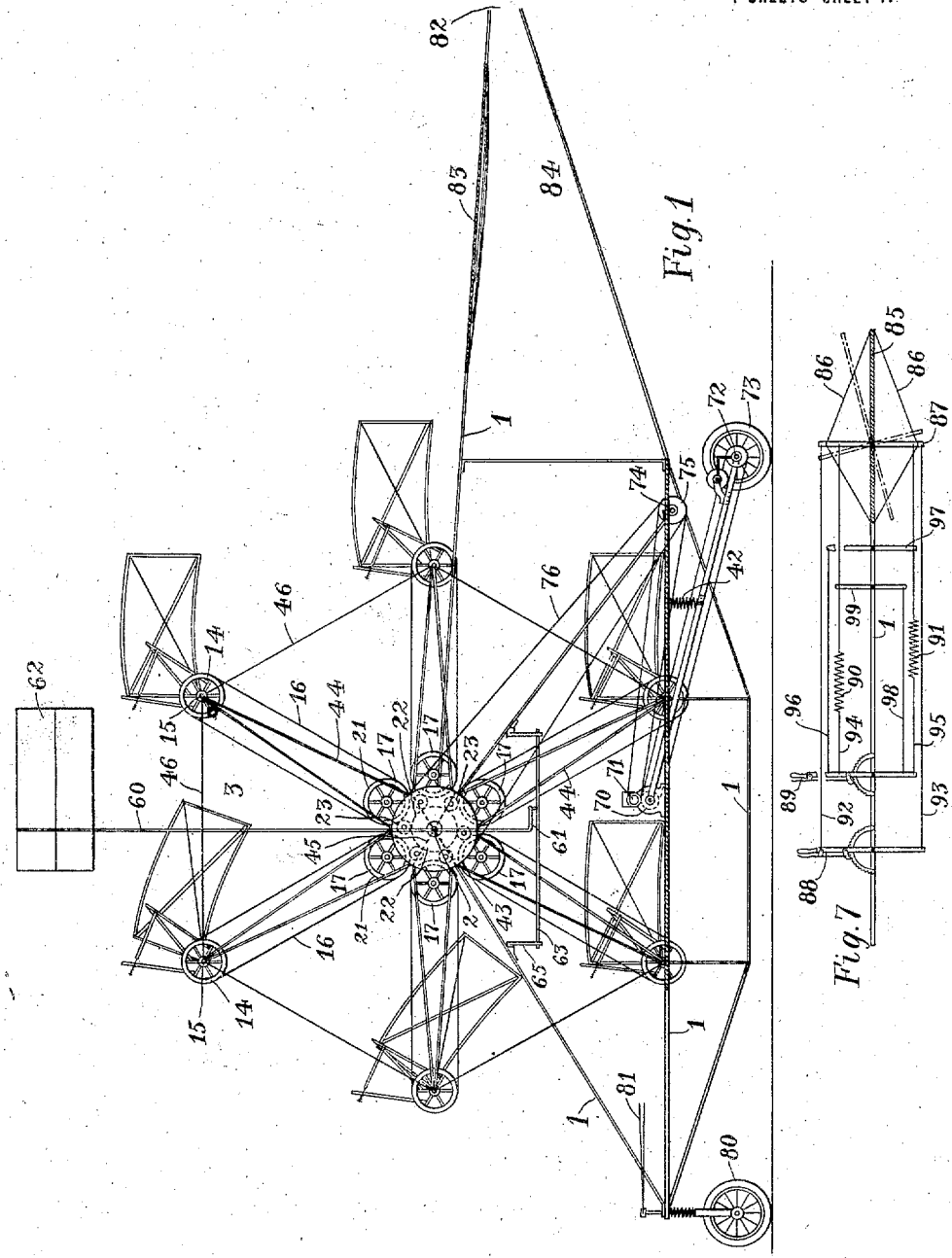

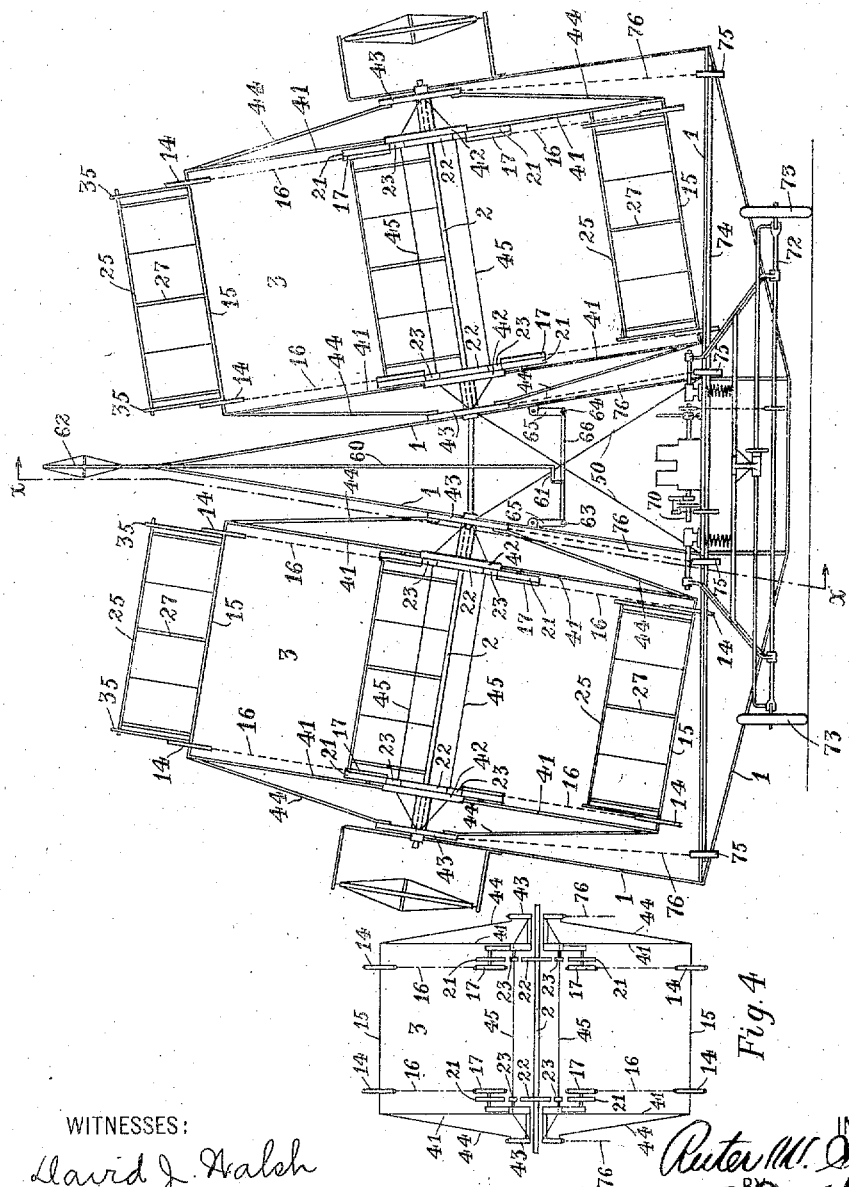

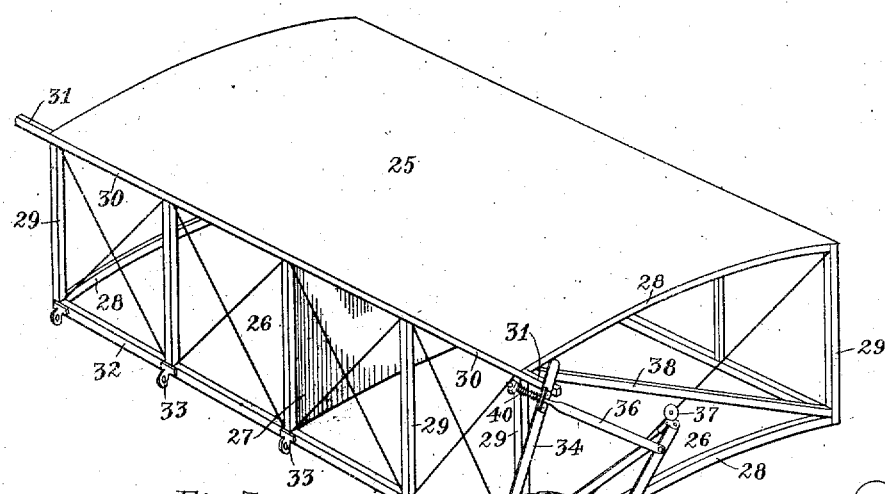

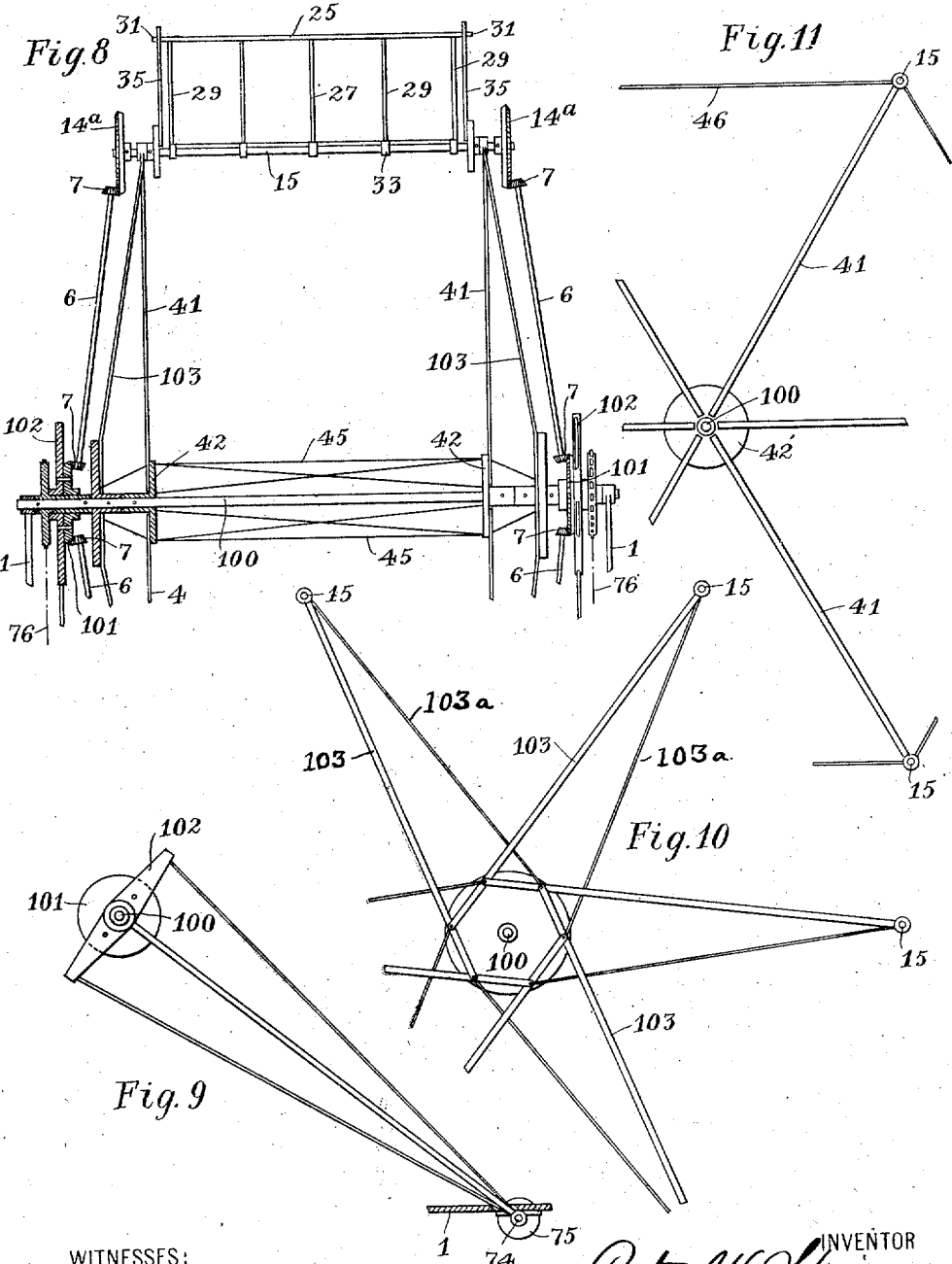

RUTER W. SPRINGER, OF THE UNITED STATES ARMY.

FLYING-MACHINE.

1,208,395.
Specification of Letters Patent.
Patented Dec. 12, 1916.

Application filed June 11, 1910. Serial No. 566,445.

*To all whom it may concern:*

Be it known that I, RUTER W. SPRINGER, of the United States Army, a citizen of the United States of America, temporarily residing at Fort Schuyler, in the county of Westchester and State of New York, have invented certain new and useful Improvements in Flying-Machines, of which the following is a specification, reference being had therein to the accompanying drawing.

This invention relates to a side-wheel flying machine.

Preliminary to the description of my invention, I may remark generally upon the subject of flying machines that they can be classified according to their weight substantially as follows:—

*First. Those that are necessarily lighter than air.*—These are generally called dirigible balloons. They consist of a float filled with a buoyant gas and a motor operating a propeller for driving the float in a horizontal direction as desired.

*Second. Aeroplanes.*—An aeroplane consists of a flat surface adapted to be more or less supported by the air pressure upon its under surface, and operated by a motor and propeller. It will be seen that if an aeroplane is provided with cigar-shaped or other shaped floats, it will still be properly called an aeroplane, and also that as the floats are made larger and more buoyant, an aeroplane may imperceptibly pass into a dirigible or airship. In other words, while an aeroplane is usually made heavier than air, it may be lighter than air, and while it is called a heavier-than-air flying machine, its weight is not necessary to its propulsion.

*Third. Flying machines that are propelled by gravity.*—These machines are necessarily much heavier than air and are generally of the flapping wing type. Inasmuch as the term "heavier-than-air flying machines" has already been appropriated for aeroplanes, I propose to call the third class "gravity flying machines" because they operate by means of gravity.

It is to this third and last class, therefore, that my present invention relates.

It consists moreover substantially in the construction, arrangement and combination of parts to be hereinafter described, and then more particularly pointed out in the appended claims.

In the accompanying drawings illustrating my invention, Figure 1 is a side elevation of my improved flying machine with the tail omitted, said elevation being viewed on the line $x$—$x$ of Fig. 2. Fig. 2 is a front end elevation of the entire machine. Fig. 3 is an enlarged detail perspective view of one of the aeroplanes, the same being shown in the form of a bi-plane. Fig. 4 is a diagrammatic view of one of the plane supporting wheels in front elevation to show the general plan and arrangement of the various parts. Fig. 5 is an enlarged detail view of a part of the shock absorbing mechanism which serves to sustain the recoil of the aeroplane movement at certain times. Fig. $5^a$ is an edge view of the same parts shown in Fig. 5. Fig. 6 illustrates a modification of the means for connecting together for joint movement the gears of the mechanism employed to maintain the aeroplane in the desired working positions. Fig. $6^a$ is an edge view of the same. Fig. 7 is a diagrammatic view of the tail or rudder for steering the machine and the leverage devices for manipulating it. Fig. 8 is a partial front elevation of an alternative form of the wheel that carries the supporting planes. Figs. 9, 10 and 11 represent various details of this alternative construction. Fig. 12 is a view diagrammatic in character, illustrating the safety alarm mechanism.

Similar characters of reference designate corresponding parts throughout all the different figures of the drawing.

Wing-flapping machines are practically impossible of success, owing to the enormous strain thrown upon the wings in the rapid alternations of motion, and owing to the fact that the larger and heavier the machine, the more slowly the wings must flap, and therefore, the longer will be the interval between the flaps, through which interval the entire apparatus is unsupported and is falling. Since the distance of fall of a body increases as the square of the time, it will be seen that a machine having wings of twice the length, which make one flap in twice the time, will fall four times as far during the upstroke and only have twice as much downstroke with which to recover this. Therefore, the larger the machine, the faster proportionally must the wings flap, whereas, they ought to flap more slowly in proportion. Now, just as when man wanted to make a machine to run like a horse, he duplicated the horse's legs circularly so as to form wheels which could run at much greater speed, so I, in the carrying out of my present improvement, propose to indefinitely multiply or duplicate the wings of a bird arranging them into a wheel so that they may flap at any desired speed. In general, therefore, my invention consists of a series of aeroplanes or wings, for that is virtually what the aeroplanes are, arranged to move circularly in a substantially vertical plane. For convenience, the car, engine and other associated operating parts are placed in the center of the apparatus, with a rotating wheel at each side, each of which wheels comprises an aforesaid circular series of aeroplanes; although I can, if desired, use any preferred number of wheels. For the sake of convenience, the wheels are placed side by side with their axes practically continuous. However, I do not desire to limit myself to the particular type herein shown, and therefore claim these and other mechanical equivalents in so far as the claims hereinafter presented may permit.

The main frame of my improved flying machine is designated 1, and may be built in any desired form in order to enable the various mechanical parts of the apparatus to be conveniently supported relatively to each other therein for successful operation. Braces 50 are preferably employed for giving the structure strength and rigidity. At each side of the main frame 1 is supported a wheel 3 carrying a series of supporting planes, the same being carried revolubly upon a stationary shaft 2 as shown in Figs. 1 and 2 or upon a movable shaft 100, as shown in Figs. 8 to 11. These wheels 3 are believed to give the best results if inclined at an angle of about 20° to the vertical as shown in Fig. 2; and of course, when so inclined, the supporting or driving shafts 2 or 100 are similarly inclined.

Inasmuch as each one of the wheels 3 consists of a circular series of aeroplanes, the best way to explain the construction and operation is to begin with a detailed description of one of the aeroplanes which I preferably utilize; and this I proceed to do, referring particularly to Fig. 3 which shows one of these aeroplanes on an enlarged scale. This aeroplane which is simply an illustration of all of them consists preferably of two surfaces, an upper one 25, and a lower one 26. It is provided with a vertical partition 27 lying between the two surfaces 25 and 26, and situated in the direction of flight, and intended to prevent skidding or side slipping. The planes 25 and 26 are stretched upon fore-and-aft ribs 28 whose curve should be made in accordance with the formulæ given in my copending application for Letters Patent on wings or propellers for aerial dynamics and other purposes, filed August 8th, 1907, Serial Number 387,635. The outer ribs on each side should be made heavier than the inner ones. The upper and lower planes 25 and 26 are connected by vertical posts 29 which are braced with cross wires as shown. The front frame 30 of the upper plane 25 is made longer than said plane 25 at each end so as to project at both sides at 31 as shown. The front frame 32 of the lower plane 26 may be made much lighter, and is provided with rings or bearings 33 for attachment to one of the cross beams 15 of one of the large wheels 3 on which cross beam 15 the bi-plane is loosely hung for operation in the manner to be presently stated. At each side of this bi-plane is also provided a brace rod 38 extending from the front rod 30 of the upper plane to any desired part of the lower plane. It may be briefly stated that each bi-plane is hung absolutely free upon its bearings 33 so as to rotate around the rod or cross beam 15 on the wheel, and that it is held in its proper position by the impinging of the ends 31 of the front rod 30 upon suitable shock receiving framework kept constantly in an upstanding position for the purpose, as I shall presently describe. Thus, it will be seen that the brace rod 38 should be made quite strong, inasmuch as it is obliged to withstand the strain of both planes.

Remembering that all of the aeroplanes belonging to two or to all of the wheels 3 are built in precisely the same fashion, and are all similarly hung upon supporting cross rods 15, it is to be noted that on each of these rods 15 at each side of the bi-plane is journaled a sprocket wheel 14 which is capable of free rotation. Each sprocket wheel 14 has attached thereto on the side next to the bi-plane a frame 34, the attachment of which is pivotal and said frame 34 is so located as to lie in front of the ends 31 of the front rod 30. Each sprocket wheel 14 also has a somewhat similar frame 35 which extends in the rear of the extremities 31 of the front rod 30. The frames 34 and 35 are connected together by means of a supporting brace 36, and this brace is preferably pivoted to the frame 35, while its other end passes loosely through an opening in the frame 34 or in a casting 5 attached to said frame, and has its projecting end 39 provided with a nut between which and the casting 5 is tensioned a spring 40 which gives a yielding and elastic effect to the connection of the end of the rod 36 with the frame 34. Another spring 36ª attached to the frames 34 and 35 serves to provide an additional elastic connection. (See Fig. 5.) The frame 35 may also, if desired, be provided with a safety mechanism 37 of any approved pattern by which either an electrical alarm bell will be rung or ignition current for the motor will be cut off whenever the front rods 30 and 31 strike the frame 35 or whenever these ends 31 press upon the frames 35 with more than a predetermined pressure. The form of safety mechanism 37 illustrated in the drawings, Figs. 3 and 12, is an electric alarm bell with suitable circuit connections and a circuit closer arranged to be operated whenever dangerous or undesirable conditions, such as just referred to, occur. It is to be understood of course that at each side of each of the aeroplanes, there are these sprocket wheels 14 carrying the upstanding frames 34 and 35 between which the projecting parts of the aeroplanes vibrate, and which upstanding frames receive the shock of the movement of the aeroplanes in one direction or the other and serve as buffers for said shock, and also for the purpose of communicating warning signals so as to insure safety and provide that the flying machine will be operated successfully. It is necessary therefore that these upstanding frames 34 and 35 should be constantly maintained in their upright positions throughout the various revolutions of the wheels 3; and, in order to secure this constancy of vertical or upright position and enable these frames at all times to serve as obstacles in the paths of movement of the projections 31 on the aeroplanes, I have provided suitable mechanism to accomplish this result. Proceeding to describe this mechanism in greater detail, I will say that over each of the sprocket wheels 14 passes a sprocket chain 16 which extends to a sprocket wheel 17 similar to the sprocket wheel 14, and having exactly the same number of sprockets. Each chain 16, after passing around the wheel 17 returns to the wheel 14. By referring to Fig. 1, it will be seen that each sprocket wheel 14 alongside of each of the aeroplanes has its chain 16, which runs around the other sprocket wheel 17, and that therefore there is a series of the sprocket wheels 17 located near the center of the wheel 3. In the present example of the invention where there are six aeroplanes, there are obviously six of the sprocket wheels 14 on the periphery of the wheel 3, and six sprocket wheels 17 arranged in a circular series around the central shaft 2 of the wheel.

Each of the sprocket wheels 17 is keyed upon the same shaft with, or is securely attached to a cog wheel 21. By reference to Fig. 4, the arrangement of these sprockets and cogs at the center of the wheel 3 will be clearly manifest. A cog wheel 22 is secured rigidly to the stationary axle 2 of the wheel 3 near each end of said axle 2, there being thus two of the cog wheels 22 on each axle 2. These rigid and immovable cog wheels 22 are connected to the cog wheels 21 by means of the intermediate or idler cog wheels 23, suitably supported on studs or other means projecting from a part of the main frame. The cog wheels 21 and the main cog wheels 22 have exactly the same number of cogs or teeth. It will be observed moreover that the intermediates or idlers 23 serve to reverse the motion. Therefore as each main cog wheel 22 is rigid and does not rotate, the six cog wheels 21 with their attached sprocket wheels 17 will revolve at such relative speeds, as they are carried bodily around the fixed shaft 2, as the wheel rotates about said shaft, and hence the wheels 14 will always stand with the same cog or sprocket turned upward. Therefore, since the sprockets 17 are connected by chains 16 with the sprockets 14, which carry the up-standing frames 34 and 35, it will be seen that the sprocket wheels 14 and their frames 34 and 35 will continually stand in the same relation, each frame 34 being intended to constantly stand in a substantially vertical position. Thus, when the air pressure suddenly comes with increasing force upon the lower surface of a bi-plane, due to the rotation of the wheel 3, said bi-plane will be thrown with more or less violence forwardly against the frame 34 and if it were not for some safety device, the sprocket chain 16 would be likely to be broken under the strain of the impact. But this strain is relieved by the construction which I have just described, and more particularly by the use of the elastic cushioning connection of the link 36 with the frame 34 at the end which employs the springs 40 and 36a. By this means, the frame is permitted to give a little at the point of pressure, and immediately come back into correct position again.

In Figs. 6 and 6a, I have shown a modified form of the connections between the sprocket wheels 14 and 17, consisting instead of a chain 16, of a shaft 6 having on each end a beveled pinion 7, one of which meshes with the wheel 14a and the other with the wheel 17a. Suitable supports for the shaft 6, as also for the other parts can be provided, and all the changes that are needful for this purpose can be made. It will be found in many locations that such a drive for the gearing constituting the essential part of the frame operating mechanism will be preferable to that shown in Figs. 3 and 5.

As already described, each of the wheels 3 is revolubly supported upon a stationary axle 2, as shown in Fig. 2, or upon a rotary axle 100 as shown in Fig. 8. Each of the wheels is provided with a suitable number of radiating arms, the number employed in the present example of the invention being six. Referring to Figs. 1 and 2, it will be seen that there are six of these radiating arms 41 springing from a hub piece 42. There are corresponding radiating arms and hub pieces on both sides of each of the wheels 3. A short distance outside of the hub pieces 42 are other hub pieces 43 which are formed with sprockets upon their outer peripheral edges. From each hub piece 43, radiate arms 44, which join with the radial arms 41 at their outer extremities. The idler or intermediate cogs 23 hereinabove referred to are not placed directly upon the radial arms 41, but upon small lateral projections from the same so as to allow brace rods 45 to extend from the centers of the outer hubs 43 to each of the radial arms 41 beyond the peripheries of the stationary cog wheels 22, and from there across to the opposite radial arms 41, and from there on to the center of the opposite hub piece 43. These brace rods 45 serve to keep the hubs of each wheel 3 in proper relative position while allowing the axle 2 to be exposed for the attachment of the stationary cog wheels 22. They also afford a very light form of construction. The ends of the radial arms 41 and 44 are further braced by peripheral rods 46 which serve to keep all the various parts of the wheel in proper relative position (see Fig. 1). The intersections of the radial rods 41 and 44 with the peripheral rods 46 also form the points of attachment for the transverse beams or axles 15 upon which the aeroplanes are hung. Of course, it is quite evident that additional braces and other details of the frame may be provided if found necessary, what I have here shown and described being offered simply by way of example. I may also advert to the triangular bracing 50 already once mentioned which is employed to keep the frame stanch and regular. The wheels 3, although shown in the drawings as set at an angle of 20° need not necessarily be so situated, but can be placed relatively to each other at any preferred angle to bring about the best results in propulsion and steering. Extending upward between the two wheels 3 is a vertical rod 60 having at its lower end a handle 61 or some other convenient operating mechanism, and having at its upper end a rudder 62. This rudder normally stands parallel with the line of flight. It is not used for the purpose of changing the direction of flight, and hence is not to be termed a steering device, but its chief object is for promoting and securing lateral stability. Near the handle 61 (see Figs. 1 and 2) in the center of the machine is a rod 63 upon one side and a rod 64 upon the opposite side which are arranged to extend longitudinally through the machine, and are made to swing upon hangers 65. They are connected by links 66 with the handle 61 of the rudder 62. Hence if the entire machine should tip to one side, or to the other, the operator who is seated contiguous to the handle 61 can, by putting out his hand on one side or the other, strike the rod 63 or the rod 64 and thus balance himself by automatically turning the rudder 62 so as to right the machine.

On the main frame 1 at some suitable point, is an engine 70, having a drive wheel 71. This is connected by means of belting, clutches, etc., to the axle 72 of the road wheels 73. It is also connected by suitable belting, clutches, etc., to the axle 74 carrying four drive wheels 75 all as shown in Fig. 2. These drive wheels 75 are connected by long sprocket chains or belts 76 with the sprocket hubs 43 for driving the wheels 3. It will probably not be necessary to use any special device for the attachment of the wheels on account of the tilting of the plane of the wheels 3, but any suitable device may be employed if desired. It is to be noted moreover that each wheel 3 is driven from both of its sides so as to insure uniform motion. On the main frame 1 is also a steering wheel 80 at the front, provided with suitable means 81 for its operation. This main frame 1 extends backward a long distance as shown at 82 in two parts, one at each side of the machine, and at the rear end thereof is provided a tail which can be operated in any desired manner. The rear extensions of the frame carry webs 83 that constitute steadying planes for the machine.

In Fig. 7, I have shown a form of mechanism for operating the tail or rudder, deflecting it vertically into one position or into the other as may be required. Assuming 85 to be the tail ribs and membrane in connection with which the truss wires 86 are used, it will be seen that said wires 86 are connected to a tail truss 87. 88 denotes one handle and 89 another handle. Cords 92 and 93 pass from the handle 88, and are connected to the opposite arms of the tail truss 87. Cords 94 and 95 run from the handle 89 to the opposite arms of the tail truss 87, said cord 94 being provided with a spring 90 and said cord 95 being provided with a spring 91. A cord 96 also leads from the handle 89 to one arm of a truss 97 to the other arm of which the cord 95 is also attached, and a cord 98 connects the handle 89 with one arm of another truss 99 to the other arm of which a cord 94 is connected. It is intended that the handle 89 shall be locked in such position as will set the tail at the normal angle for ordinary, or specially desired, use. Then if the handle 88 be moved backward the cord 93 connected therewith will pull the lower end of the tail truss 87 forward, tilting the tail and depressing its rear portion. At the same time the cord 94, which is elastic because it includes the spring 90, will yield, while the cord 96, remaining taut, will prevent the spring 91, which is a part of the cord 95, from yielding. Therefore the movement of the handle just referred to will be against one spring only, the other spring remaining inoperative. When the handle 88 is released the tail will automatically return to its normal position, to which it had been set by the lever 89. Corresponding operations will occur if the handle be moved forward, the spring 91 being then stretched and the spring 90 remaining inoperative. If the handle 88 be not fastened but left free to swing, the tail will be kept elastically in its normal position, but always subject to positive control at any time through the handle 88. I do not herein claim a tail for a flying machine that is vertically movable, combined with adjustable means for changing the angle thereof, such means being elastically connected with the tail so that the latter is held forcibly though yieldingly, and with means for positively setting the tail at will irrespective of the said elastic connecting means, as such subject matter is claimed in my co-pending application No. 309,911, filed April 4, 1906.

Referring now to Figs. 8, 9, 10 and 11, it will be noted that I employ an axle 100 which revolves with the wheel that carries the supporting planes instead of serving as a stationary support, like the axle 2, on which the wheel rotates. In the main, the arrangement of the parts is very much the same as in the other figures of the drawing, except that an equalizer cog wheel 101 is employed. Connections are made between this cog wheel and the gear wheels which uphold the shock receiving frames alongside of the various bi-planes. A strong crank arm for the bracing of the cog wheel on the main frame is shown at 102. This and the attached cog wheel 101 are the only stationary parts here illustrated. All the other parts revolve along with the plane supporting wheel. The spokes 41 of the wheel are tension elements and are very light and arranged in a radial series.

In Fig. 10 I represent in side elevation the arrangement of other spokes, in addition to those designated 41, employed to support the beams or shafts 15 upon which are hung the aeroplanes. There are two series of spokes designated respectively 103 and 103$^a$. A pair of these spokes is employed in supporting each end of each of the said beams or shafts 15. They are disposed to form a truss as represented in said Fig. 10, each preferably extending approximately tangentially from the hub. The spokes 103 which extend rearward toward the perimeter of the hub of the wheel are larger and stronger than the spokes 103$^a$ as there will be more compression upon them.

Referring to the main frame and the wheels 73 which carry the body of the frame, it may be remarked that the shaft 72 (see Fig. 2) may be provided at each outer end with a universal joint, and sheering devices may be provided for each of the wheels 73. These sheering means upon the two sides should be connected so as to operate together. In case it is necessary to start the flying machine upon a road which does not run directly against the wind, these sheering means should be so adjusted as to cause the flying machine to turn its head up into the wind.

In the operation of my improved flying machine, it will be noted that after the engine is started, the machine will be run along upon the ground until it attains a considerable velocity, then the tail, by means of the mechanism shown in Fig. 7, or some other suitable device will be operated so as to cause the front of the machine to rise. As soon as the machine is clear of the ground, the plane-carrying wheels will be actuated by means of the engine mechanism so as to continue the flight. These wheels may be revolved in either direction. Theoretically, it would be better to revolve them in the same direction as the ground wheels 73, so that the down going aeroplanes should be at the front of the wheels, and act upon air which has not been disturbed. But practically it is found better to operate the wheels in a reverse direction so that the descending aeroplane, being farther to the rear, the center of support will be thrown farther back behind the center of gravity, causing the entire machine to tilt forward. The machine must tilt to a considerable angle so that the front edge of each aeroplane will be lower than the rear, and so that the machine will all the time be really in the position where it may be viewed as sliding downhill. Of course, if this operation were continued at this rate, the machine would soon strike the ground, but this is prevented by reason of the fact that the descending aeroplanes are continually lifting the machine. When the aeroplanes pass to the front part of the wheels and begin to rise, the air pressure is somewhat relieved upon their lower surfaces, and they lag downward as shown. The amount of "lag" of the planes during their upward movements of rotation will depend upon the speed of flight, the speed of revolution of the wheels 3, the weights of the aeroplanes and the location of their axes of support relative to their centers of gravity, factors which will have to be worked out to suit different types and sizes of machines. Under all conditions, however, the "lag" is never sufficient, when the machine is in flight, to destroy the supporting action of the planes. When they reach the top of the wheel, the air pressure is restored on their lower surfaces, and they resume their position with their front edges lower than their rear edges.

The aerial process by which I accomplish flight with this machine is fully set forth in my co-pending application for Letters Patent filed on April 20, 1906 Serial Number 312,891 to which reference is here made.

It will be seen that the machine herein described is one that is adapted to carry out the peculiar method of gravitational aerial navigation described in my aforesaid application No. 312,891, and one in which each of the aeroplanes, considered by itself and alone, constantly acts as a supporting plane, that is to say, it operates to assist in supporting the machine during its upward movements as well as during its downward movements. During its downward movements, considered with reference to the machine as a whole, the supporting plane operates as a glider, passing over and upon a supporting body of air, and the pressure of the plane upon such supporting body of air is increased, above the normal due to the weight of the machine borne by said plane, by reason of the said relative downward movement thereof. After the lowest limit of movement of the said supporting plane has been reached it immediately changes its angle so that its angle of incidence is increased, due to the "lag" of the aeroplane, and thereby passes onto a "rising plane", or body of supporting air, along and over which it travels as the plane moves upwardly, considered with reference to the machine as a whole. These changing conditions of each supporting plane are rhythmically and successively repeated in the operation of the machine and in carrying out my aforesaid process of flight.

Having thus described my invention, what I claim as new and desire to secure by Letters Patent is:

1. In a gravity flying machine, the combination with a plurality of aeroplanes employed to support the machine and on the under surface of each of which a constant air pressure is maintained, means for moving the said aeroplanes in a path of revolution, and means for insuring that the said aeroplanes shall, during normal flight of the machine, be maintained in position to support the machine upon the air as a glider, while pursuing the downward portions of their paths of revolution, and while pursuing the upward portions of their paths of revolution permitting their rear portions to "lag", without however relieving them of supporting air pressure.

2. In a gravity flying machine, the combination with a main frame, of a plural series of supporting aeroplanes, on the under surface of each of which a constant air pressure is maintained, means for causing the said series of aeroplanes to pursue paths of revolution, each individual aeroplane being pivotally supported, means for maintaining the said aeroplanes, while the machine is in normal flight, in position to support the machine as a glider while pursuing the downward portions of their paths of revolution, and, while they are pursuing the upward portions of their paths of revolution, permitting their rear edges to "lag", without, however, relieving them of supporting air pressure and means for limiting the movements of the said individual aeroplanes about their pivotal supports.

3. In a flying machine, the combination of a plural series of aeroplanes supported to move in a circular path and arranged to have an individual flapping motion, resilient means for sustaining the shock of movement when the flapping action reaches its proper limits and danger signaling mechanism arranged in connection with each aeroplane.

4. In a gravity flying machine, the combination of a rotary wheel, a series of sustaining aeroplanes carried thereby, each loosely hung in the said wheel, and frames for allowing the aeroplanes a limited amount of swinging movement but preventing them from being unduly deflected from their normal positions, whereby throughout their entire paths of rotation as carried by the said wheel they operate as sustaining planes.

5. In a gravity flying machine, a rotatable, circular series of sustaining, depressed aeroplanes individually supported so as to be free to change their angles relative to the plane of flight of the machine in combination with a circular series of upstanding frames arranged to keep the aeroplanes within proper limits of motion, so that they at all times operate as sustaining planes for supporting the machine, and means for upholding said frames in their proper position at all times, said means consisting essentially of gear mechanism at the center of the said circular series of aeroplanes, and also contiguous to the frames.

6. In a flying machine, the combination of a main frame, wheels on opposite sides thereof placed at an angle to each other and to the vertical line, said wheels each comprising a circular series of aeroplanes supported in said wheels and each being free to change its angle relative to the plane of flight of the machine as a whole in combination with a series of constantly upstanding frames carried by each wheel, and revolving therewith, means for maintaining the said frames in constant upstanding positions in order that the aeroplanes may be restrained from being unduly deflected from their normal path during the revolving operation.

7. In a flying machine having a tail that is vertically movable, the combination with such tail of an adjustable lever by which the tail is set to maintain the desired angle, flexible, elastic connections between the opposite arms of the said adjustable lever and the tail, a pair of intermediate levers pivotally supported between their ends, one of the levers having one of its arms connected with one of the said elastic connections between the adjusting lever and the tail, and the other intermediate lever having one of its arms connected with the other of the said elastic connections, flexible, inelastic connections between the other arms of the said intermediate levers and the adjusting lever, and means for positively moving the tail at will to any desired angle, irrespective of the said elastically connected setting means.

In testimony whereof I affix my signature in presence of two witnesses.

RUTER W. SPRINGER.

Witnesses:
W. B. FAUSTMANN,
M. SINGER.